Patented June 5, 1951

2,555,371

UNITED STATES PATENT OFFICE 2,555,371

SUBSTITUTED DIPHENYL OXIDE SULFONIC ACID SULFIDES

Carl F. Prutton, Cleveland Heights, Ohio, assignor to The Lubrizol Corporation, Wickliffe, Ohio, a corporation of Ohio No Drawing. Application September 25, 1948, Serial No. 51,309

10 Claims. (Cl. 260—512)

This invention relates broadly to sulphides and polysulphides of certain sulphonic acid derivatives of substituted diphenyl oxide, and the salts thereof as new compositions of matter.

In general, the new chemical compounds of my invention may be defined as organic sulphides (including polysulphides) which have included in the molecule:

(a) A diphenyl ether group;
(b) An aliphatic group attached to the diphenyl ether group;
(c) A $SO_3X$ group where X is hydrogen or one equivalent of a salt-forming radicle; and
(d) The molecule contains an average of from about 6 to about 40 aliphatic substituent carbon atoms, and preferably from about 10 to about 32 aliphatic substituent carbon atoms.

Although in certain instances, depending upon the method of preparation, (c) may be attached to the aliphatic group (b) which is in turn attached to a ring carbon atom of (a), for most uses it is desirable that at least one of each of groups (b) and (c) be bonded to a ring carbon atom, such as, a ring carbon atom of (a).

Preferred chemical compounds are the sulphides which are characterized by the presence therein of the structure $RSO_3M$ wherein R is a diphenyl ether (or oxide) group having an aliphatic substituent attached thereto, and M is hydrogen or one equivalent of a salt-forming radicle. Such sulphides and polysulphides may contain, and under certain of various methods of production will contain, a plurality of such $RSO_3M$ groups linked by sulphur as a monoatomic or polyatomic linkage in linear or non-linear form.

The term "sulphide" as used herein and in the appended claims is intended to include the polysulphides.

More particularly, this invention is concerned with the provision, as new chemical compounds, of the acids and salts of aliphatic substituted diphenyl ether sulphonic acid sulphides in which said aliphatic substituents are monovalent and the molecule contains a total of from about 6 to about 40 aliphatic substituent carbon atoms.

A specific class of compounds to which this invention is directed are those which have the following structural formula:

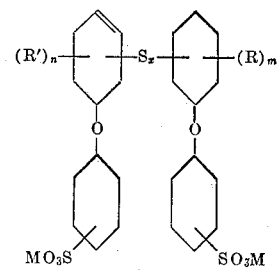

in which R and R' are monovalent aliphatic radicles, M is hydrogen or one equivalent of a salt-forming radicle, $x$ is at least one and no more than five, and $m$ and $n$ represent the number of R and R' groups, respectively, attached to the diphenyl ether nucleus, the values of $m$ and $n$ being such that there are present in the molecule a total of from about 6 to about 40 aliphatic substituent carbon atoms, and preferably from about 10 to about 32 aliphatic substituent carbon atoms. In most instances, R and R' will be the same aliphatic radicles, but it is to be understood that within the limits of the number of aliphatic carbon atoms in the entire molecule, R and R' may be different aliphatic radicles.

It will be observed that in the prepared compounds of this invention there is present the common and characterizing radicle $MO_3SR$—. It therefore becomes convenient to consider the preparation of the organic or "R" portion of this radicle. It is intended that the term "aliphatic substituted" be inclusive of the situation where a carbon of the aliphatic substituent is directly attached to a carbon atom of the diphenyl ether nucleus, as well as the situation where a carbon atom of the aliphatic substituent is indirectly attached to a carbon atom of the diphenyl ether nucleus through an intervening element such as, oxygen, sulphur, nitrogen, or an organic functional group such as the carbonyl or ester group. So far as the general procedure by which the aliphatic substituents may be attached to the diphenyl ether nucleus is concerned, ordinary and conveniently employed processes of alkylation, condensation, or reaction may be followed to effect such a substitution. For example, when it is desired to incorporate an alkyl radicle into the diphenyl ether nucleus, any one of a wide variety of alkylation methods may be used, such as, a Friedel-Crafts reaction using aluminum chloride as the catalyst, acid catalyst alkylation procedures employing concentrated phosphoric or sulphuric acids, and the like. Where it is desired to attach an aliphatic radicle through an intervening element or group, the well-known Williamson reaction may be employed or the sodium phenate of hydroxy diphenyl ether may be reacted with an alkyl halide or an alkyl sulphate. These reactions are all well-known and commonly employed in the field of organic synthesis.

To exemplify more specifically a procedure for the incorporation of an aliphatic substituent on the diphenyl ether nucleus, I have found that exceptionally fine yields of aliphatic substituted diphenyl ether may be obtained by admixing an aliphatic halide with the diphenyl ether in the presence of an acid activated clay catalyst, such as, "Super Filtrol," "Tonsil," "Attapulgus" clay, and the like and a small amount of zinc chloride. The proportion of the substituting material is, in any case, determined by the number of substituents which it is desired to have in the final product. As indicated above, the materials of this invention contain, on the average, from about 6 to about 40 aliphatic substituent carbon atoms in the molecule. In certain instances, therefore, it may be desirable to incorporate more than one monovalent aliphatic substituent group per diphenyl ether nucleus. Thus, if two substitutents are desired, the mole ratio of diphenyl ether to substituent providing material will be at least 1:2, respectively.

Another convenient method of introducing such aliphatic substituent groups is to employ an unsaturated aliphatic substituent providing material and effect a condensation with the diphenyl ether by contacting the two materials in the presence of an acid activated clay. This reaction proceeds smoothly at temperatures ranging from about 70 to 150° C. and, providing the requisite number of moles of aliphatic substituent providing material is used, yields a product which, upon further treatment in accordance with the description to follow, will yield a molecule containing from about 6 to about 40 aliphatic carbon atoms.

A specific example of such alkylation is as follows and is intended for illustrative purposes only and is not to be construed as limiting the invention to the precise methode of compound disclosed therein.

EXAMPLE 1

510 grams of diphenyl ether (3 m.), 448 grams of cetene-1 (2 m.) and 85 grams of $BF_3 \cdot H_2O$ (1 m.) were mixed and stirred for a period of 6 hours at room temperature. A cooling bath was used at first when the temperature went to 50° C. The catalyst layer was drawn off, the product washed with water, sodium bicarbonate solution, and finally with water. The product was dried over magnesium sulphate and fractionated.

The first fraction boiled in the range of 118–130° C. at 13 mm. Hg and weighed 313 grams. The estimated composition of this fraction is 35 grams of cetene-1 and 278 grams of diphenyl ether. The second fraction boiled in the range of 205–220° C. at 2 mm. Hg and weighed 386 grams. This fraction consisted predominantly of monocetyl diphenyl ether. The theoretical molecular weight for monocetyl diphenyl ether is 394. The molecular weight of this second fraction was found cryoscopically in benzene and dioxane to be 377 and 386 respectively. The residue weighed 220 grams. The second fraction was a colorless fluid having a mild odor.

EXAMPLE 2

510 grams of diphenyl ether, 672 grams of octene-1, 408 grams of zinc chloride (anhydrous) and 60 grams of a 36% solution of HCl were placed in a flask and refluxed at 130–165° C. for 16 hours. There was little refluxing after this time. The organic material was decanted from the solid zinc chloride and dissolved in 750 ccs. of lactol spirits. The solution was washed with water 3 times with a 5% sodium bicarbonate solution and finally 3 times with water. The solvent was removed by distillation and the residue was fractionated through a 4 ft. column. 443 grams of a fraction boiling at 170–190° C. at 4 mm. Hg were obtained. This product was found to be monocapryl diphenyl ether which is a water white liquid having no odor.

EXAMPLE 3

570 grams of diphenyl ether and 140 grams of "Kleenflo-M-4" (an acid activated clay) were placed in a flask equipped with a stirrer, thermometer, dropping funnel and reflux condenser with a water trap. The water trap was filled with caprylene so that none would be lost from the reaction mixture. The diphenyl ether was heated to 220–230° C. and 1135 grams of capryl alcohol added from the dropping funnel at such a rate that the temperature was maintained with the violent reflux. The first 50% or capryl alcohol was added in 60 minutes, but the total reaction time was 4.5 hours. The reaction mixture was cooled to room temperature and filtered through filter paper. The clear yellow filtrate was then fractionated through a 4 ft. column. The forerun comprising diphenyl ether weighed 250 grams and boiled at a temperature below 160° C. at 2 mm. Hg. The second fraction consisting of monocapryl diphenyl ether weighed 320 grams and boiled at 160–190° C. at 2 mm. Hg. The third fraction consisting of dicapryl diphenyl ether weighed 600 grams and boiled in the range of 195–225° C. at 2 mm. Hg. The residue weighed 245 grams. The first two fractions were colorless, odorless liquids and the residue was an amber liquid having no odor.

EXAMPLE 4

614 grams of monochlor diphenyl ether and 173 grams of "Super Filtrol" (an acid activated clay) were introduced into a 3-liter, 3-necked flask equipped with a stirrer, thermometer, condenser, dropping funnel, and water trap. 1053 grams of capryl alcohol were dropped into the chlor diphenyl ether at 190–225° C. in a period of 6 hours. 50 grams of "Super Filtrol" were added to the reaction mixture that stood overnight before reaction was completed. 200 ccs. of water were trapped out. The reaction mixture was filtered through "Hyflo" (diatomaceous earth filter aid) and a filtrate distilled through a 4 ft. column packed with glass helices. The following fractions were obtained:

40 grams of forerun boiling in the range of 0–70° C. at 8 mm. Hg;

164 grams of forerun 2 boiling in the range of 70–185° C. at 8 mm. Hg;

178 grams of forerun 3 boiling in the range of 130–170° C. at 2 mm. Hg;

611 grams of monocapryl chlordiphenyl ether boiling in the range of 170–205° C. at 2 mm. Hg;
135 grams of an intermediate alkylate boiling in the range of 205–225° C. at 2 mm. Hg;
103 grams of dicapryl chlordiphenyl ether boiling in the range of 225–270° C. at 2 mm. Hg;
67 grams of residue boiling at a temperature in excess of 270° C. at 2 mm. Hg.

Forerun fraction 2 and 3 were colorless liquids having a faint odor. The monocapryl chlordiphenyl ether fraction and the intermediate fraction were viscous yellow liquids having a faint odor. The dicapryl chlordiphenyl ether was a viscous orange liquid having a faint odor.

EXAMPLE 5

1055 grams of diphenyl ether and 200 grams of "Super Filtrol" were mixed and heated to 175° C. A side arm water trap was provided on the reaction vessel. 2025 grams of methyl amyl alcohol were added slowly, the point of entry of such alcohol being beneath the surface of the diphenyl ether. The temperature at which the alcohol was added was 175–185° C. After 5 hours of addition, approximately ⅔ of the methyl amyl alcohol had been added, but the rate of reaction became very slow. An additional 200 grams of "Super Filtrol" were added and the methyl amyl alcohol again added slowly for three hours until the reaction became very slow. Approximately 250 ccs. of methyl amyl alcohol remained. The temperature was allowed to drop during the addition of the remaining alcohol and the final temperature was only 120° C. The mixture was refluxed for .5 hour to remove any remaining water, and the product then filtered. The filtrate was stripped to 175° C. vapor temperature at 25 mm. Hg, and the residue was the product. This product was an oily liquid having a light yellow color and a faint odor. The specific gravity was .950 at 25° C. and the viscosity in Saybolt Universal seconds at 100° F. was 251.56 and at 210° F. was 73.79. Although it was sought to introduce about 3.2 methyl amyl groups per diphenyl ether nucleus, it was found that it was very difficult to introduce more than 2 such alkyl groups into the diphenyl ether nucleus.

Preparation of the sulphonic acid derivatives

The aliphatic substituted diphenyl ether product which may be produced according to the method specifically given above, or by any other convenient methods for accomplishing the same result, are, in the preferred case, then converted to the sulphonic acid derivatives. Although there are numerous procedures by which the —$SO_3H$ group may be introduced into the molecule, the most convenient of these involves the treatment of the aliphatic substituted diphenyl ether intermediate with a slight molar excess of chlorsulphonic acid at a temperature in the range of from about 25° C. to about 75° C. Other sulphonating agents, such as, fuming sulphuric acid and $SO_3$ may be employed for this step.

Rather than illustrate the sulphonating step as a single example at this point, it is more convenient to include this step under a discussion of the preparation of the sulphides for the reason that a sulphuric acid derivative is generally not isolated prior to the sulphid forming step. Sulphonations of the type contemplated herein are commonly employed and the nature of such reaction is well understood. Generally, such sulphonation is accomplished by adding the sulphonating agent dropwise to the aliphatic substituted diphenyl ether while vigorously stirring and cooling the mixture. If it is desired to isolate the sulphonic acid, water may be added to the mixture resulting in a viscous layer which separates out consisting predominantly of the aliphatic substituted diphenyl ether sulphonic acid. Generally, the sulphonic acid group will be present in a ratio of about one sulphonic acid radicle per diphenyl ether nucleus. However, it is obvious that by increasing the relative proportion of the sulphonating agent, compounds containing an average of more than one sulphonic acid group per diphenyl ether nucleus may be produced. Since these products are particularly useful as detergents, I prefer to maintain the ratio of sulphonic acid producing reagent to that which is productive at an average of one $SO_3H$ group per diphenyl ether nucleus.

Preparation of the sulphide derivatives

The sulphur containing derivatives of the foregoing aliphatic substituted diphenyl ether sulphonic acid intermediate materials, may be secured by reacting such intermediate with a sulphurizing reagent such as $SCl_2$ or $S_2Cl_2$ for a period of time sufficient to complete the reaction, and at a relatively low temperature. When this process is carried out, there results a molecular structure in which at least 2 aliphatic substituted diphenyl ether groups are interconnected by a sulphur bridge. When such a bridge structure has been obtained, and the bridging group consists of 1 or 2 sulphur atoms, that product may be further treated with a sulphur imparting reagent such as elemental sulphur to increase the number of bridging sulphur atoms from 1 or 2 up to 3, 4, or 5, depending upon the molar ratio of sulphur which is employed. It is also believed that under such conditions, there may be formed simultaneously various amounts of bridge compounds in which a plurality of aliphatic substituted diphenyl ether sulphonic acid sulphide or disulphide molecules become linked by 1 or more sulphur atoms. I have denominated these materials as polymers, and the general formulas given at the beginning of the specification contemplate this latter type of structure.

The following examples are illustrative of the method of preparing preferred examples of the final products contemplated hereby including the sulphonating, sulphide forming and salt-forming steps in the preparation of these new and useful compounds. It should be pointed out that none of the procedural steps employed herein involve unusual and unknown chemical reactions. Moreover the conditions for effecting such reactions are well-known, are commonly employed, and because of the nature of the reactions, the products are obtained in high yield. Also because of the nature of the reagents, i. e. their tendency to proceed to completion by the elimination of HCl or water, the temperatures at which the reactions are carried out are not critical, except that excessive temperatures which would destroy the product should be, and would be avoided by anyone seeking to effect the synthesis herein involved. Moreover the period of time required for each reaction step is not critical for the reason that the majority of these reactions proceed to completion at a rate which is in great measure determined by the temperature at which the reaction is allowed to proceed. The end of the reaction is visually observed when no further evolution of HCl or evidence of interaction can be discerned.

Therefore in the following examples, and in those given above, where temperatures and periods of time have been designated, their inclusion in the examples is not to be interpreted as being a statement of the conditions absolutely necessary to produce the compounds of this invention, or conversely that any variation from such conditions will result in a compound different from that produced in accordance with the examples. The conditions specified, therefore, are those which from experience have been found most satisfactory from particularly a mechanical standpoint, i. e. ease of maintaining such temperatures, greater ease in controlling the rate at which the reaction proceeds so that the capacity of the reaction containers is not exceeded, etc.

EXAMPLE 6

315 grams of dicapryl diphenyl ether were dissolved in lactol spirits and sulphonated at room temperature by the dropwise addition of 103 grams of chlor sulphonic acid. This mixture was then stirred for a period of 5 hours at room temperature. 57 grams of $S_2Cl_2$ were then added dropwise at room temperature and the reaction mixture subsequently warmed to 90° C. in order to drive out HCl gas. 50 ccs. of methyl alcohol were added to the cooled reaction mixture and it was neutralized by the addition of 40 grams of calcium hydroxide. The solution was filtered with the aid of "Hyflo" and the solvent was finally removed under reduced pressure. The final still temperature was 110° C. at 20 mm. 392 grams of the calcium sulphonate of dicapryl diphenyl ether disulphide were obtained. This product is a black tarry material having no odor. Upon analysis the product showed 11% sulphur, 0.25% chlorine, and had a 10.3% calcium sulphate ash. At concentrations of 50, 25, 10, and 1% in a SAE 10 oil, this product was found to be insoluble after standing for a period of one month.

EXAMPLE 7

400 grams of monocapryl diphenyl ether were mixed with 300 ccs. of carbontetrachloride. 173 grams of chlor sulphonic acid were added at 30-40° C., and the reaction mixture heated slowly to 55-60° C. at which temperature the mixture was stirred for .5 hour with 20 inches of vacuum applied. The product was then cooled to 40° C. and 96 grams of $S_2Cl_2$ added. The temperature was increased to 60° C. and a vacuum applied for .5 hour. This mixture was then cooled to 40° C. and 155 ccs. of chloroform and 90 grams of calcium hydroxide added. 1000 ccs. of benzene and 585 grams of SAE 10 oil to make a 50% concentrate were added. This mixture was heated to reflux and filtered through "Hyflo" until clear. The solvents were removed at 160-170° C. and 27 inches vacuum. The residue weighing 1101 grams was the product. This product was a black-brown tarry material having a burnt odor. The material analyzed 3.5% sulphur and had a calcium sulphate ash of 8.2. Upon solution in oil, the product was found to settle out at concentrations of 50, 10 and 1%.

It should be noted that variations in the procedural steps outlined above may be made without substantially altering the nature of the final product, for example, it is not necessary that the sulphonic acid derivative of the aliphatic substituted diphenyl ether be made prior to the formation of the sulphide or polysulphide linkage. These steps may be performed in the reverse order. For best results the salt of the product should be made as the last step. With respect to the salt-forming step the examples given above show a direct neutralization procedure. In certain instances it will be found desirable particularly when preparing heavy metal salts such as zinc, cobalt, cadmium, tin, iron, mercury, etc., to first prepare the sodium, lithium, or potassium salt, and by a process of double decomposition with the halide of the heavy metal convert to the heavy metal salt derivative. Other and obvious variations in the products of these compounds may be made without departing from the molecular structure set forth herein.

As indicated above, this invention also contemplates not only the sulphonic acid derivatives, but also the neutralization products thereof. The salts of the foregoing compounds may be secured by conventional procedures, some of which have been illustrated in connection with the examples given above. Thus, I may use the oxides, hydroxides and carbonates of the alkali metals, such as sodium, potassium and lithium of the alkaline earth metals, such as barium, calcium, magnesium and strontium, or other polyvalent metals such as copper, aluminum, lead, iron, tin, antimony, manganese, bismuth, nickel, etc. Also of utility are the non-metallic salts such as those which are produced by neutralizing with ammonia, or the amino compounds, such as triethanolamine, diethanolamine, cyclohexylamine and other such organic amino compounds. The salts of the present invention in their pure state are generally solid materials. The monovalent salts of these compounds are soluble in water in concentrations from 5-50%. The polyvalent metal salts are insoluble in water and tend to form a cloudy suspension in the lower alcohols.

In the examples given above, I have demonstrated the production of products which contain one or more aliphatic substituents attached to the diphenyl ether group. The production of these alkylates as well as the production of the final products of the materials of the specific examples are illustrative of the processes which may be employed in preparing other alkylates and other sulphonic acid derivatives, the molecules of which contain from about 6 to 40 aliphatic substituent carbon atoms, and preferably from about 10 to about 32 aliphatic substituent carbon atoms. As aliphatic substituent providing materials, therefore, I may use aliphatic unsaturates and aliphatic halides containing from 3 to 20 carbon atoms in straight or branched chains. Therefore, I may use isopropyl chloride, propylene; butyl chlorides, such as, tertiary butyl chloride; butylenes, such as, isobutylene, and polyisobutylene, amyl chlorides, amylenes, hexyl chlorides, hexylenes, heptyl chlorides, heptylenes, octyl chlorides, octenes, nonyl chlorides, nonenes, decyl chlorides, decylenes, dodecyl chlorides, dodecylenes, tetra decyl chlorides, tetradecylenes, cetyl chlorides, cetenes, oleyl chloride, oleoyl chloride, octadecenes, and the like. I have also successfully condensed the alcohols and ethers of certain aliphatic materials, organic residues of which have been named above to provide the aliphatic substituted diphenyl ether. The mole ratio of the aliphatic substituent providing material to the diphenyl ether will of course be such that there is an average of from about 6 to about 40 aliphatic substituent carbon atoms in the molecule of the completed product. It will be observed that among the examples given above are several which are not productive of purely hydrocarbon aliphatic substituents and it is within the contemplation of this invention to provide those materials as new and useful compounds which contain in the aliphatic substituent elements other than carbon and hydrogen, particularly carbon, hydrogen, and oxygen, and in certain instances, carbon, hydrogen, oxygen, and an organic substituent group such as halogen, nitrogen, phosphorus, sulphur, etc.

It is also within the the contemplation of this invention to provide materials in which the aliphatic substituents attached to the diphenyl ether nuclei are the same or different, i. e. one diphenyl ether nucleus may contain, for example, one cetyl group, and the other may contain one octyl group. Such a mixed alkylate would result from the employment of a mixture of aliphatic substituent providing materials in the alkylation step, or by treatment of a mixture of aliphatic substituted diphenyl ether sulphonic acids with a sulphide bridge forming reagent.

The compounds of this invention have been found to be of utility as detergents, intermediates, etc.

Specific examples of compounds which are capable of production in accordance with the above general illustrative procedures are the following, the number appearing in the brackets after the aliphatic group represents the average number of such groups per diphenyl ether group:

Calcium sulphonate of isopropyl (2.0) diphenyl ether disulphide
Calcium sulphonate of tetrabutyl (2.0) diphenyl ether disulphide
Calcium sulphonate of hexyl (1.0) diphenyl ether disulphide
Calcium sulphonate of capryl (2.5) diphenyl ether disulphide
Barium sulphonate of capryl (2.5) diphenyl ether monosulphide.
Barium sulphonate of capryl (2.0) diphenyl ether trisulphide
Magnesium sulphonate of diisobutenyl (1.0) diphenyl ether disulphide
Zinc sulphonate of lauryl (1.0) diphenyl ether disulphide
Calcium sulphonate of cetyl (1.0) diphenyl ether disulphide
Barium sulphonate of cetyl (1.0) diphenyl ether tetrasulphide
Barium sulphonate of cetyl (1.0) diphenyl ether trisulphide
Calcium sulphonate of oleyl (1.0) diphenyl ether disulphide
Calcium sulphonate of cetoxy (1.0) diphenyl ether disulphide
Potassium sulphonate of cetyl (1) caproxy (1) diphenyl ether disulphide Although the foregoing examples are all metallic salts, the organic salts, i. e. those resulting from neutralization of the acidic compound with a basic organic material, i. e. an amine such as aniline, amyl amine, mono-, di-, or tri-ethanol amine, etc., are also contemplated. The acidic materials, i. e. prior to neutralization with a salt-forming reagent, are also new chemical compounds useful as intermediates.

Throughout the foregoing specification and in the appended claims, reference has been had to the number of aliphatic substituent carbon atoms present in the entire molecule as being from 6 to about 40. In this regard it should be noted that confusion may arise in the cases of the polyvalent metal salts. In the preparation of such salts, it will be seen that it is possible to form not only an inner salt, but also salts in which the metal atom serves as a bridging element between two aliphatic substituted diphenyl ether sulphonic acid sulphide groups. In all probability, the polyvalent metal salt of such sulphonic acid-sulphides will comprise a mixture of the inner salt with the salt formed by bridging between two similar sulphonate-sulphide groups. It is intended that the terminology "from 6 to 40 aliphatic substituent carbon atoms in the molecule" shall be inclusive of this latter type salt product. Essentially, therefore, this terminology is equivalent to a statement that there are present in the molecule from 6 to 40, and preferably from 10 to 32 aliphatic substituent carbon atoms per diphenyl ether sulphonic acid sulphide nucleus.

Other modes of applying the principle of the invention may be employed, change being made as regards the details described, provided the features stated in any of the following claims or the equivalent of such be employed.

I therefore particularly point out and distinctly claim as my invention:

1. As new chemical compounds, a aliphatic substituted diphenyl ether sulphides which contain the $SO_3X$ group wherein X is selected from the class of hydrogen and one equivalent of a salt-forming radicle in which said aliphatic substituents are monovalent and the molecule contains a total of from about 6 to about 40 aliphatic substituent carbon atoms.

2. As new chemical compounds, a aliphatic substituted diphenyl ether sulphide which contain the $SO_3M$ group bonded to a ring carbon wherein M is selected from the class of hydrogen and one equivalent of a salt-forming radicle, in which said aliphatic substituents are monovalent and the molecule contains a total of from about 6 to 40 aliphatic substituent carbon atoms.

3. As new chemical compounds, a polyaliphatic substituted diphenyl ether sulphide which contain the $SO_3X$ group wherein X is selected from the class of hydrogen and one equivalent of a salt-forming radicle in which said aliphatic substituents are monovalent and the molecule contains a total of from about 6 to about 40 aliphatic substituent carbon atoms.

4. Chemical compounds in accordance with claim 2 in which the aliphatic substituted diphenyl ether sulphide contains more than 2 aliphatic substituent groups.

5. As new chemical compounds, a polycapryl substituted diphenyl ether sulphide which contain the $SO_3X$ group wherein X is selected from the class of hydrogen and one equivalent of a salt-forming radicle, which molecule contains a total of from about 10 to about 32 alkyl substituent carbon atoms.

6. Chemical compounds in accordance with claim 2 in which M is a metal.

7. Chemical compounds in accordance with claim 2 in which the aliphatic groups are each 8 carbon atom aliphatic radicles.

8. As new chemical compounds, the sodium salt of capryl substituted diphenyl ether sulphonic acid disulphide, which molecule contains from 10 to 32 aliphatic substituent carbon atoms.

9. As a new chemical compound, the sodium salt of monocetyl substituted diphenyl ether sulphonic acid disulphide.

10. As new chemical compounds, the calcium salts of polycapryl substituted diphenyl ether sulphonic acid disulphides which molecules contain a total of from 10 to 32 aliphatic substituent carbon atoms.

CARL F. PRUTTON.

REFERENCES CITED

The following references are of record in the file of this patent:

UNITED STATES PATENTS

| Number | Name | Date |
|---|---|---|
| 1,758,277 | Daimler | May 13, 1930 |
| 2,081,876 | Prahl | May 25, 1937 |
| 2,242,260 | Prutton | May 20, 1941 |
| 2,244,512 | Brandt | June 3, 1941 |
| 2,245,643 | Borglin | June 17, 1941 |
| 2,418,894 | McNab et al. | Apr. 15, 1947 |
| 2,465,902 | McNab | Mar. 29, 1949 |